United States Patent

Blondeel et al.

[11] Patent Number: 5,158,480
[45] Date of Patent: Oct. 27, 1992

[54] DISTRIBUTING FACILITIES

[75] Inventors: Geert Blondeel, Dordegem, Belgium; Guenter Hauf, Langweid/Lech, Fed. Rep. of Germany

[73] Assignee: Siemens Aktiengesellschaft, Munich, Fed. Rep. of Germany

[21] Appl. No.: 713,060

[22] Filed: Jun. 11, 1991

[30] Foreign Application Priority Data

Jun. 11, 1990 [DE] Fed. Rep. of Germany ....... 4018693
Sep. 25, 1990 [DE] Fed. Rep. of Germany ....... 4030312

[51] Int. Cl.⁵ .......................................... H01R 13/648
[52] U.S. Cl. .................................... 439/607; 439/719; 439/676
[58] Field of Search ............... 439/607, 608, 610, 676, 439/92, 709, 712, 719, 49; 361/428

[56] References Cited

U.S. PATENT DOCUMENTS

| | | | |
|---|---|---|---|
| 4,641,900 | 2/1987 | Japngie | 439/76 |
| 4,729,064 | 3/1988 | Singer, Jr. | 439/716 X |
| 4,756,695 | 7/1988 | Lane et al. | 439/610 X |
| 4,824,403 | 4/1989 | De Luca et al. | 439/719 X |
| 4,829,564 | 5/1989 | Jarvis | 439/701 X |
| 4,838,811 | 6/1989 | Nakamura et al. | 439/607 |
| 4,858,070 | 8/1989 | Buron et al. | 439/607 X |

Primary Examiner—Larry I. Schwartz
Assistant Examiner—Khiem Nguyen
Attorney, Agent, or Firm—Hill, Van Santen, Steadman & Simpson

[57] ABSTRACT

A distributing facility having of a plurality of distributor modules arranged in a frame, whereby every distributor module is composed of a guiding element for the feeding of laterally incoming and outgoing lines, a function element arranged on a front side thereof for the acceptance and wiring of line ends of the incoming and outgoing lines, and a shielded jack whose contacts are connected with individual terminals of the associated function element. The individual jacks can be randomly connected with each other by means of shunt lines provided with corresponding plugs.

14 Claims, 2 Drawing Sheets

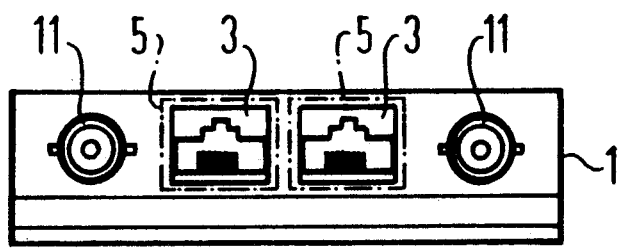
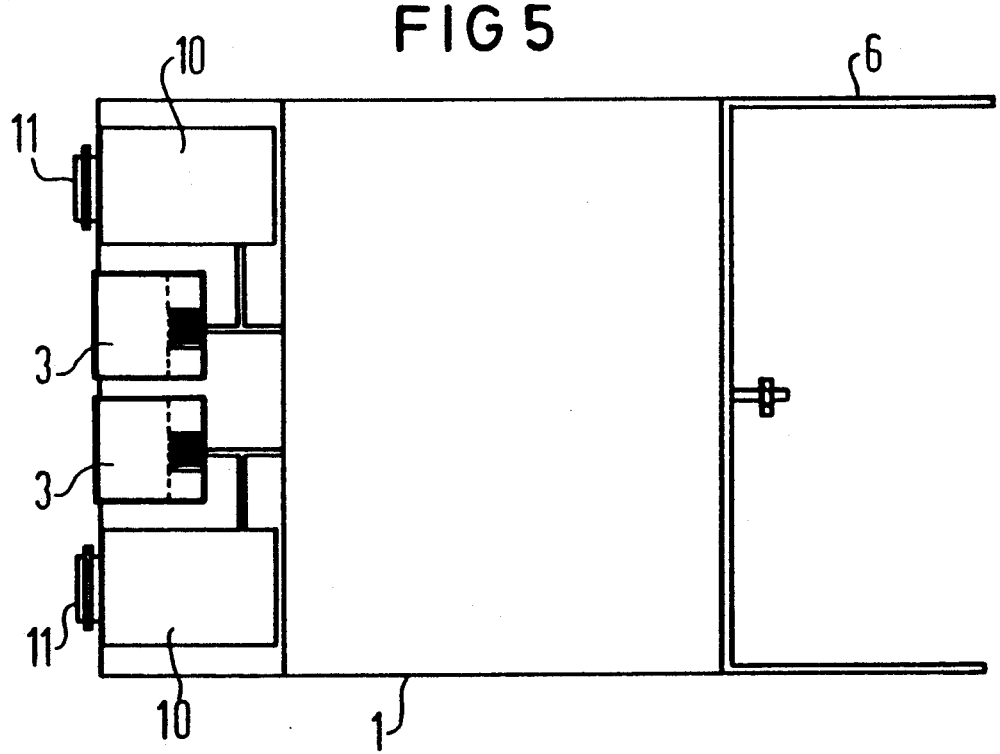

DISTRIBUTING FACILITIES

BACKGROUND OF THE INVENTION

The present invention is directed to distributor facilities for optional connection of incoming and outgoing lines by means of connection lines.

Many different distributor facilities are known in the prior art, for example, facilities with shunt connections composed of jumper wires to produce solderless connections. Moreover, distributor facilities with patch-cables, modular jacks and other plug connectors in conjunction with patch panels are known in the prior art.

SUMMARY OF THE INVENTION

It is the object of the present invention to provide optimized distributing facilities for transmissions in a high frequency range which has good transmission properties and which is simple to handle by an operator.

Thus, for example, changes of shunt connections in solderless connection can only be performed by specialist personnel, while distributor means with patch panels have a backside cable connection that make such changes very difficult. Furthermore, the shielding required for transmissions in a high frequency range is not optimal in the case of both of these facilities.

According to the present invention, the above mentioned problem is solved by a distributing facility that is composed of a plurality of distributor modules arranged in a frame, whereby each distributor module is composed of a wiring element for the feeding of laterally incoming and outgoing lines, a function element being arranged on a front side of the distributor module for the acceptance and wiring of the line ends and a shielded jack being provided whose contacts are firmly connected with the individual terminals of the associated function element. Also, the individual jacks can be connected with one another in random fashion by means of shunt lines provided with corresponding plugs.

In the distributing facility according to the present invention the advantages of distributing facilities with solderless connections and the advantages of distributing facilities with patch panels and modular jacks or other plug connections are combined with each other. By means of the present invention existing function elements can be converted. For the incoming and outgoing lines a solderless connection is used, whereas the shunt itself occurs by means of ready-made cables provided with plugs so that the shuntings can be performed by non-expert personnel.

One useful embodiment of the distributing facilities is characterized in that respectively one function element and the associated jacks are surrounded by a shroud. By means of the shroud, a remaining shield gap between the line ends of the incoming and outgoing lines and the shunt lines can be closed in a reliable fashion. For an increase in transmission reliability another advantageous embodiment of the distributing facilities according to the present invention is characterized in that the function elements are provided with receptacles for overload safety plugs.

A disadvantageous aspect of the distributing facilities according to the invention can be that only uniform transmission media, that is, only lines with equal characteristic impedances can be connected to one another. Thus, relatively long distance networks, for example, almost always consist of symmetrical lines, whereas unsymmetrical lines are used for shelf wirings to be connected thereto. In such cases, costly adapter pieces must be used which also require additional space. In order to avoid this disadvantage yet another useful embodiment of the distributing facilities according to the present invention is characterized in that every jack is connected in parallel with a passive adaptor member having a coaxial plug device. In the case of this embodiment no additional adapter pieces are necessary. Depending on the type of connection, one of the two plug connections is used so that a uniform structure and a clearly understandable plug arrangement results.

In order to achieve a complete good shielding effect an additional useful embodiment of the distributing facilities according to the present invention is characterized in that the shrouds of the jacks are connected with the respective adapter members by large-area bondings.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 4 is a partial front view of a distributor module of a distributing facility according to the present invention; and FIG. 5 is a plan view of the distributor module shown in FIG. 4.

DESCRIPTION OF THE PREFERRED EMBODIMENT

Figure 1:
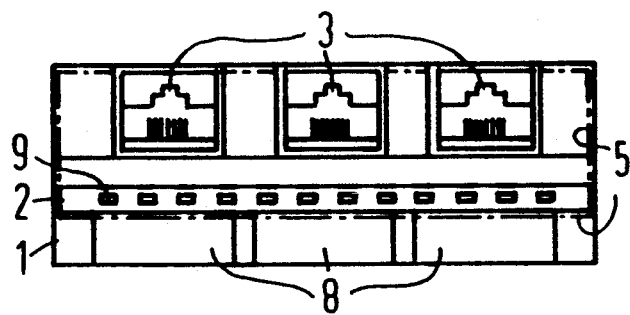
FIG. 1 is a front view of a distributor module with three jacks of a distributing facility.
Figure 2:
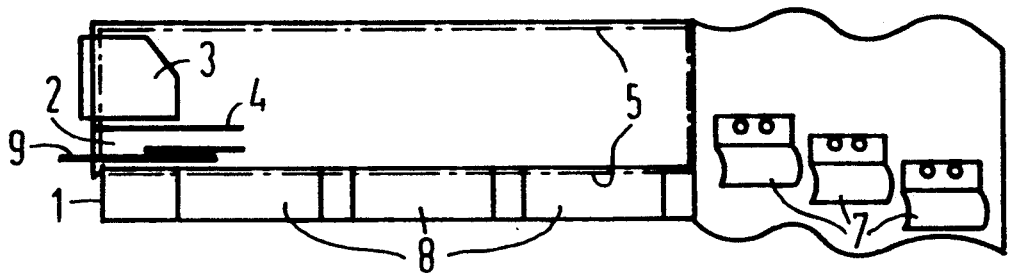
FIG. 2 is a side view of the distributor module shown in FIG. 1.
Figure 3:
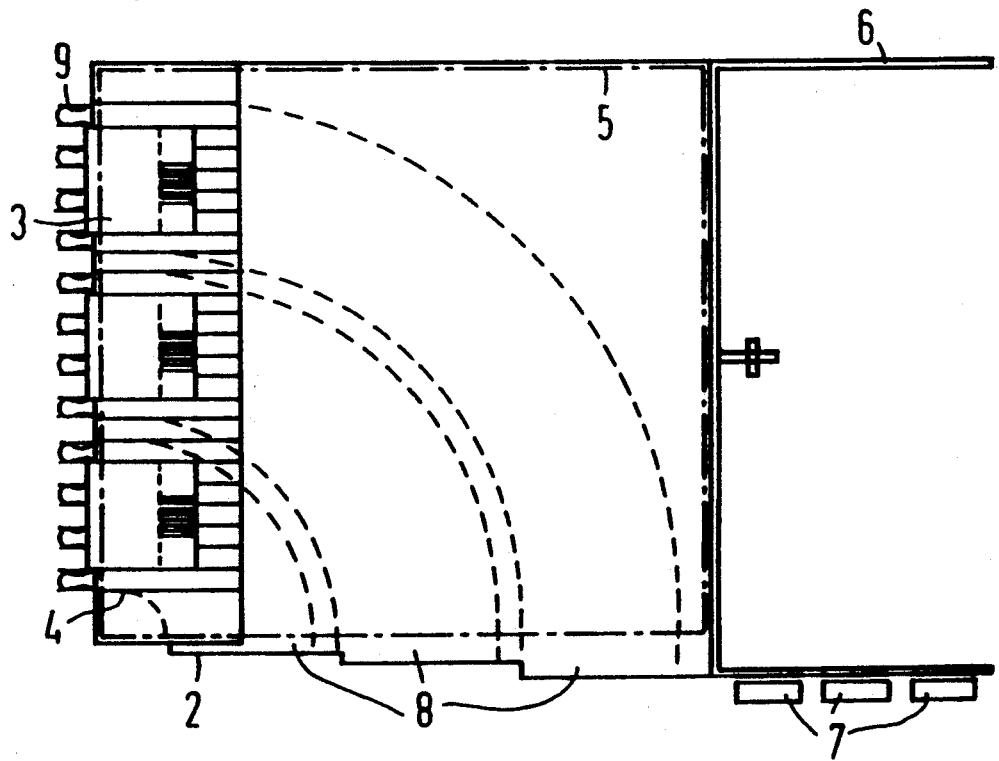
FIG. 3 is a plan view of the distributor module shown in FIG. 1 and FIG. 2.

The distributing facility shown in the FIGS. 1 to 3 is basically composed of a frame, such as, sheet metal housing 6 to which several distributor modules are fastened. Such a distributor module is shown in more detail in the FIGS. 1 to 3. In this example, the distributor module has three jacks 3, however each distributor module can be equipped with less or with more jacks.

The laterally incoming transmission lines are guided through the wire guiding channels 8 to the front side of the distributor modules. Additionally, the incoming or outgoing transmission lines can be fastened with cable clamps 7 at the housing 6. The ends of the incoming or outgoing transmission lines are connected at the cut-clamp-contacts 9. These cut-clamp-contacts 9 are part of the function elements 2. These function elements 2 can be fashioned in various manners, for example, as elements with or without overvoltage protection.

In order to be able to derive the overvoltage from the outside lines, the cable side of each contact is extended towards the back and constitutes the contact locations for the acceptance of the overload safety plug on the backside of the function element.

The cut-clamp-contacts 9 of the function element 2 are firmly connected with a plate 4 on which the jacks 3 are firmly mounted. For an increase of the shielding effect the respectively associated function elements and jacks can be surrounded by a shroud 5.

Two jacks are respectively connected with each other (not shown in the exemplary embodiment) by means of shunt lines having the corresponding plugs. These shunt lines involve shielded cables with shielded plugs. In this way, personnel can connect in a simple manner each incoming transmission line with any random outgoing transmission line.

FIGS. 4 and 5 show the embodiment of the present invention whereby every jack is connected in parallel with an adapter member 10 with a coaxial plug device 11. In order to achieve a good protective effect, the shrouds 5 of the jacks 3 can be connected to the respective adapter members 10 by means of large-area bondings. As an exemplary application let the case be assumed that a shelf wiring is to be connected to a large area local distributor network wherein it is assumed that the large area local distributor network has symmetrical lines and wherein the shelf wiring has unsymmetrical lines. In the case of the distributing facility of the present invention the possibility exists to use one of the plug devices 5 or 11 depending on the application. As an example, personnel can connect to the coaxial plug device 11 an unsymmetrical connecting line from a control unit of the shelf wiring, for example, a line concentrator, thereby establishing connection to an incoming symmetrical outside cable that is internally connected to the coaxial plug device 11 and the associated jack 3.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A distributing facility for the random connection of incoming lines and outgoing lines by shunt lines provided with plugs, comprising:
   a plurality of distributor modules arranged in a frame, each distributor module having a guiding element for lateral feeding of the incoming lines and outgoing lines, a function element arranged on a front side of the distributor module for the acceptance and wiring of line ends of the incoming lines and outgoing lines, and at least two shielded jacks having terminals connected to individual terminals of the associated function element; and wherein the at least two shielded jacks are randomly connected with each other by means of the shut lines provided with plugs that correspond to the at least two shielded jacks.

2. The distributing facility according to claim 1, wherein respectively one function element and the associated shielding jacks are surrounded by a shroud.

3. The distributing facility according to claim 1, wherein the function elements are provided with receptacles for overload safety plugs.

4. The distributing facility according to claim 1, wherein each shielded jack is connected in parallel with a passive adapter member having a coaxial plug device.

5. The distributing facility according to claim 4, wherein each of the function elements and the associated shielded jacks are surrounded by a shroud and wherein the shrouds of the shielded jacks are connected with the respective passive adaptor members by means of large-area bondings.

6. A distributing facility for the random connection of incoming lines and outgoing lines by shunt lines provided with plugs, comprising:
   at least one distributor modules arranged in a frame, the distributor module having a guiding element for receiving the incoming lines and outgoing lines, a plurality of function elements arranged on a side of the distributor module for the acceptance and wiring of line ends of the incoming lines and outgoing lines, and a plurality of shielded jacks, each having terminals connected to respective individual terminals of an associated function element of the plurality of function elements; and wherein the shielded jacks are randomly connected with each other by means of the shunt lines provided with plugs that correspond to the shielded jacks.

7. The distributing facility according to claim 6, wherein each of the function elements and the associated shielded jacks are surrounded by a shroud.

8. The distributing facility according to claim 6, wherein the function elements are provided with receptacles for overload safety plugs.

9. The distributing facility according to claim 6, wherein each shielded jack is connected in parallel with a passive adapter member having a coaxial plug device.

10. The distributing facility according to claim 9, wherein each of the function elements and the associated shielded jacks are surrounded by a shroud and wherein each of the shrouds are connected with the respective passive adaptor members by means of large-area bondings.

11. A distributing facility for the random connection of incoming lines and outgoing lines by shunt lines comprising:
   a plurality of distributor modules arranged in a frame, each distributor module having a guiding element for lateral feeding of the incoming lines and outgoing lines, a function element arranged on a front side of the distributor module for the acceptance and wiring of lines ends of the incoming lines and the outgoing lines, and at least two shielded jacks having terminals connected to individual terminals of the associated function element; and each shielded jack being connected in parallel with a passive adapter member having a coaxial plug device.

12. The distributing facility according to claim 11, wherein each of the function elements and the associated shielded jacks are surrounded by a shroud.

13. The distributing facility according to claim 11, wherein the function elements are provided with receptacles for overload safety plugs.

14. The distributing facility according to claim 11, wherein each of the function elements and the associated shielded jacks are surrounded by a shroud and wherein each of the shrouds are connected with the respective passive adaptor member by means of large-area bondings.

* * * * *